United States Patent
Popovic et al.

(10) Patent No.: US 9,500,369 B2
(45) Date of Patent: Nov. 22, 2016

(54) FUEL NOZZLE AND METHOD FOR OPERATING A COMBUSTOR

(75) Inventors: Predrag Popovic, Greenville, SC (US); Gilbert Otto Kraemer, Greer, SC (US); William Thomas Ross, Greer, SC (US); Vladimir Belvaev, Moscow (RU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1122 days.

(21) Appl. No.: 13/449,695

(22) Filed: Apr. 18, 2012

(65) Prior Publication Data

US 2012/0266604 A1    Oct. 25, 2012

(30) Foreign Application Priority Data

Apr. 21, 2011  (RU) .................................. 2011115528

(51) Int. Cl.
| | |
|---|---|
| F23R 3/14 | (2006.01) |
| F23R 3/28 | (2006.01) |
| F02C 7/264 | (2006.01) |
| F02C 7/266 | (2006.01) |
| F23C 7/00 | (2006.01) |

(52) U.S. Cl.
CPC .................. *F23R 3/14* (2013.01); *F02C 7/264* (2013.01); *F02C 7/266* (2013.01); *F23C 7/004* (2013.01); *F23R 3/28* (2013.01); *F23R 3/286* (2013.01)

(58) Field of Classification Search
CPC .......... F02C 7/26; F02C 7/264; F02C 7/266; F02C 7/22; F05D 2260/14; F05D 2260/98; F23R 3/12; F23R 3/14; F23R 3/286
See application file for complete search history.

(56) References Cited

U.S. PATENT DOCUMENTS

| | | |
|---|---|---|
| 3,600,891 A | 8/1971 | Gordon |
| 3,630,024 A | 12/1971 | Hopkins |
| 3,658,249 A | 4/1972 | Sharpe |
| 3,684,186 A | 8/1972 | Helmrich |
| 3,718,258 A | 2/1973 | Sharpe |
| 3,938,324 A | 2/1976 | Hammond, Jr. et al. |
| 3,954,389 A | 5/1976 | Szetela |
| 4,105,163 A | 8/1978 | Davis, Jr. et al. |
| 4,261,517 A | 4/1981 | Hopkins et al. |
| 4,299,192 A | 11/1981 | Enga |
| 4,350,131 A | 9/1982 | Kiuchi et al. |
| 4,362,021 A | 12/1982 | Willis |
| 4,395,874 A | 8/1983 | Striebel et al. |
| 4,418,543 A | 12/1983 | Faucher et al. |
| 4,429,538 A | 2/1984 | Sato et al. |

(Continued)

FOREIGN PATENT DOCUMENTS

| | | |
|---|---|---|
| CN | 1052730 A | 7/1991 |
| CN | 101397937 A | 4/2009 |

(Continued)

*Primary Examiner* — Andrew Nguyen
(74) *Attorney, Agent, or Firm* — Douglas D. Zhang; GE Global Patent Operations (57) ABSTRACT

A fuel nozzle and a method for operating a combustor are disclosed. The method includes flowing a fuel and an oxidizer through a fuel nozzle, the fuel nozzle comprising an inner tube, an intermediate tube, and an outer tube each configured for flowing one of the fuel or the oxidizer therethrough. At least one of the inner tube, the intermediate tube, or the outer tube includes a plurality of swirler vanes. The method further includes imparting a swirl to the fuel and the oxidizer in the fuel nozzle, and exhausting the fuel and the oxidizer from the fuel nozzle into a combustion zone.

20 Claims, 4 Drawing Sheets

(56) References Cited

U.S. PATENT DOCUMENTS

| | | | |
|---|---|---|---|
| 4,595,143 A | 6/1986 | Simmons et al. | |
| 4,763,482 A | 8/1988 | Wehner | |
| 4,884,746 A | 12/1989 | Lewis | |
| 4,941,617 A | 7/1990 | Russell | |
| 4,944,153 A | 7/1990 | Goerlich et al. | |
| 5,104,310 A | 4/1992 | Saltin | |
| 5,156,002 A | 10/1992 | Mowill | |
| 5,165,241 A | 11/1992 | Joshi et al. | |
| 5,251,823 A | 10/1993 | Joshi et al. | |
| 5,357,743 A | 10/1994 | Zarzalis et al. | |
| 5,359,847 A * | 11/1994 | Pillsbury | F23D 17/002 60/39.463 |
| 5,373,693 A | 12/1994 | Zarzalis et al. | |
| 5,394,688 A | 3/1995 | Amos | |
| 5,479,782 A | 1/1996 | Parker et al. | |
| 5,481,866 A | 1/1996 | Mowill | |
| 5,490,378 A | 2/1996 | Berger et al. | |
| 5,516,279 A | 5/1996 | Yap | |
| 5,579,645 A | 12/1996 | Prociw et al. | |
| 5,603,211 A * | 2/1997 | Graves | 60/776 |
| 5,605,287 A | 2/1997 | Mains | |
| 5,865,024 A | 2/1999 | Kress et al. | |
| 5,873,237 A | 2/1999 | Medla et al. | |
| 5,966,937 A | 10/1999 | Graves | |
| 5,983,642 A | 11/1999 | Parker et al. | |
| 5,987,889 A | 11/1999 | Graves et al. | |
| 6,092,738 A | 7/2000 | Becker | |
| 6,102,692 A | 8/2000 | Dobbeling et al. | |
| 6,112,511 A | 9/2000 | Myers | |
| 6,123,273 A | 9/2000 | Loprinzo et al. | |
| 6,161,387 A * | 12/2000 | Green | F23R 3/343 60/742 |
| 6,189,314 B1 * | 2/2001 | Yamamoto et al. | 60/776 |
| 6,272,840 B1 * | 8/2001 | Crocker | F02C 7/22 239/404 |
| 6,272,842 B1 | 8/2001 | Dean | |
| 6,276,924 B1 | 8/2001 | Joshi et al. | |
| 6,286,302 B1 | 9/2001 | Farmer et al. | |
| 6,311,473 B1 | 11/2001 | Benjamin et al. | |
| 6,341,629 B1 | 1/2002 | Clark et al. | |
| 6,345,505 B1 | 2/2002 | Green | |
| 6,363,726 B1 | 4/2002 | Durbin et al. | |
| 6,370,861 B1 | 4/2002 | Box | |
| 6,381,194 B2 | 4/2002 | Li | |
| 6,381,964 B1 | 5/2002 | Pritchard, Jr. et al. | |
| 6,389,815 B1 | 5/2002 | Hura et al. | |
| 6,397,825 B1 | 6/2002 | Klomp | |
| 6,419,480 B2 | 7/2002 | Al-Halbouni | |
| 6,457,316 B1 | 10/2002 | Czachor et al. | |
| 6,705,117 B2 | 3/2004 | Simpson et al. | |
| 6,761,033 B2 | 7/2004 | Inoue et al. | |
| 6,796,790 B2 | 9/2004 | Venizelos et al. | |
| 6,832,481 B2 | 12/2004 | Koenig et al. | |
| 6,871,503 B1 | 3/2005 | Inoue et al. | |
| 6,889,619 B2 | 5/2005 | Okazaki et al. | |
| 6,910,878 B2 | 6/2005 | Leger | |
| 7,213,522 B2 | 5/2007 | Okazaki et al. | |
| 7,350,357 B2 * | 4/2008 | Chen et al. | 60/737 |
| 7,464,553 B2 | 12/2008 | Hsieh et al. | |
| 7,581,396 B2 | 9/2009 | Hsieh et al. | |
| 7,607,422 B2 | 10/2009 | Carlson et al. | |
| 2004/0123653 A1 * | 7/2004 | Benson | 73/118.1 |
| 2008/0098736 A1 | 5/2008 | Lee et al. | |
| 2008/0142622 A1 | 6/2008 | Gray | |
| 2008/0148736 A1 | 6/2008 | Ishizaka et al. | |
| 2008/0163627 A1 | 7/2008 | Elkady et al. | |
| 2008/0289341 A1 | 11/2008 | Ishizaka et al. | |
| 2009/0013696 A1 * | 1/2009 | Scarinci | 60/778 |
| 2009/0126687 A1 | 5/2009 | Paterson | |
| 2009/0139237 A1 | 6/2009 | Sullivan et al. | |
| 2009/0218821 A1 | 9/2009 | Elkady et al. | |
| 2009/0297996 A1 | 12/2009 | Vatsky et al. | |
| 2010/0031661 A1 | 2/2010 | Varatharajan et al. | |
| 2010/0058767 A1 | 3/2010 | Simons et al. | |
| 2010/0170253 A1 * | 7/2010 | Berry et al. | 60/742 |
| 2010/0186368 A1 * | 7/2010 | Ikeda | F02C 7/264 60/39.821 |
| 2010/0205971 A1 | 8/2010 | Williams et al. | |

FOREIGN PATENT DOCUMENTS

| | | |
|---|---|---|
| EP | 0148599 A3 | 12/1985 |
| EP | 0378505 B1 | 3/1994 |
| EP | 0434361 B1 | 9/1995 |
| EP | 0954719 A1 | 11/1999 |
| EP | 1025398 A1 | 8/2000 |
| EP | 1041344 A1 | 10/2000 |
| EP | 1193450 A1 | 4/2002 |
| EP | 0895024 B1 | 1/2003 |
| EP | 0999411 B1 | 11/2004 |
| EP | 0905443 A3 | 12/2004 |
| EP | 1030112 B1 | 7/2005 |
| EP | 1909032 A2 | 4/2008 |
| EP | 1921381 A1 | 5/2008 |
| EP | 1193448 B1 | 12/2008 |
| EP | 2182288 A2 | 5/2010 |
| JP | 2000130757 A | 5/2000 |
| RU | 2304741 C2 | 8/2007 |

\* cited by examiner

FUEL NOZZLE AND METHOD FOR OPERATING A COMBUSTOR

BACKGROUND OF THE INVENTION

1. Field of the Invention

The subject matter described herein relates generally to combustors, and more particularly to fuel nozzles in combustors.

2. Description of Related Art

Gas turbine systems are widely utilized in fields such as power generation. A conventional gas turbine system includes a compressor, a combustor, and a turbine. In a conventional gas turbine system, compressed air is provided from the compressor to the combustor. The air entering the combustor is mixed with fuel and combusted. Hot gases of combustion flow from the combustor to the turbine to drive the gas turbine system and generate power.

Natural gas is typically utilized as a primary fuel for a gas turbine system. In some systems, the natural gas is flowed through a fuel nozzle and mixed with working fluid to provide a working fluid/fuel mixture for combustion. In other systems, the combustor may be part of a low-oxygen and/or closed loop systems, and the working fluid may be a low-oxygen working fluid. In these known systems, fuel and an oxidizer may be flowed through a fuel nozzle and mixed together with working fluid to provide an appropriate mixture for combustion. Frequently, fuel and oxidizer may be flowed through a fuel nozzle in a near-stochiometric ratio before being mixed with any significant amount of working fluid to ensure high efficiency combustion.

Known fuel nozzles and combustors may not adequately mix the fuel and the working fluid or oxidizer before combustion. This may result in relatively low efficiency combustion. Specifically, in low-oxygen systems, inadequate mixing of the fuel and oxidizer may result in longer residence times of the fuel and oxidizer in the combustor, which may cause diluting of the fuel and oxidizer by the low-oxygen working fluid. This diluting may lower the combustion efficiency.

In view of the foregoing, there exists a need for an improved fuel nozzle for a combustor and method for operating a combustor. For example, a fuel nozzle and method that provide improved mixing of fuel with working fluid and/or oxidizer and improves combustion efficiency would be advantageous. In particular, a fuel nozzle and method that provide improved combustion efficiency in low-oxygen systems would be desired.

BRIEF DESCRIPTION OF THE INVENTION

Aspects and advantages of the invention will be set forth in part in the following description, or may be obvious from the description, or may be learned through practice of the invention.

In one embodiment, a fuel nozzle for a combustor is disclosed. The fuel nozzle includes an inner tube defining a first flow passage for flowing one of a fuel or an oxidizer therethrough, the inner tube comprising a first swirler device configured to impart a swirl on the one of the fuel or the oxidizer. The fuel nozzle further includes an intermediate tube at least partially surrounding the inner tube and defining a second flow passage for flowing one of a fuel or an oxidizer therethrough, the intermediate tube comprising a second swirler device configured to impart a swirl on the one of the fuel or the oxidizer. The fuel nozzle further includes an outer tube at least partially surrounding the intermediate tube and defining a third flow passage for flowing one of a fuel or an oxidizer therethrough, the outer tube comprising a third swirler device configured to impart a swirl on the one of the fuel or the oxidizer. At least one of the first swirler device, the second swirler device, or the third swirler device includes a plurality of swirler vanes, at least a portion of the swirler vanes configured to impart a swirl on the one of the fuel or the oxidizer.

In another embodiment, a method for operating a combustor is disclosed. The method includes flowing a fuel and an oxidizer through a fuel nozzle, the fuel nozzle comprising an inner tube, an intermediate tube, and an outer tube each configured for flowing one of the fuel or the oxidizer therethrough. At least one of the inner tube, the intermediate tube, or the outer tube includes a plurality of swirler vanes. The method further includes imparting a swirl to the fuel and the oxidizer in the fuel nozzle, and exhausting the fuel and the oxidizer from the fuel nozzle into a combustion zone.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
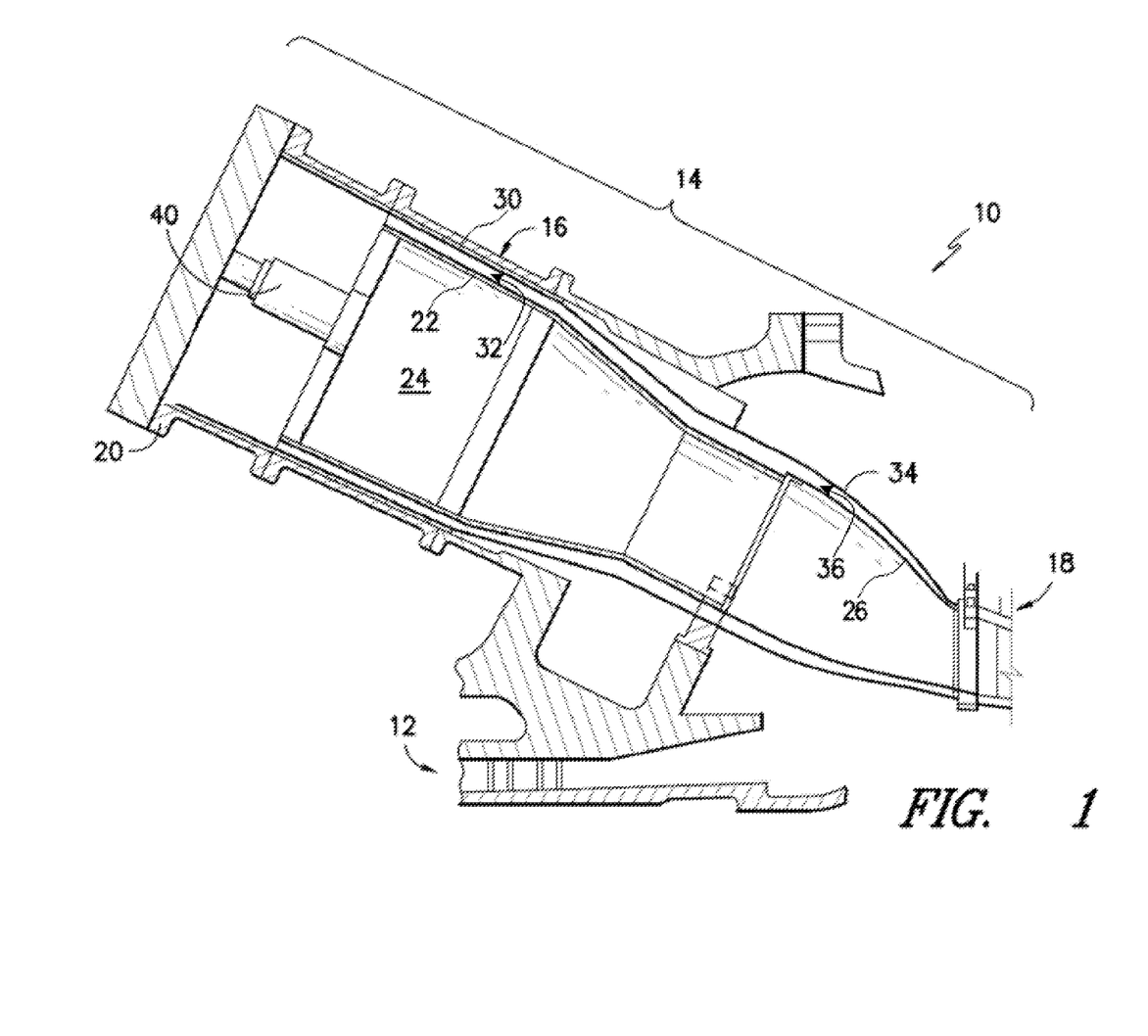
FIG. 1 is a cross-sectional view of several portions of a gas turbine system according to one embodiment of the present disclosure.

Referring to FIG. 1, a simplified drawing of several portions of a gas turbine system 10 is illustrated. The system 10 comprises a compressor section 12 for pressurizing a working fluid, discussed below, that is flowing through the system 10. Pressurized working fluid discharged from the compressor section 12 flows into a combustor section 14, which is generally characterized by a plurality of combustors 16 (only one of which is illustrated in FIG. 1) disposed in an annular array about an axis of the system 10. The working fluid entering the combustor section 14 is mixed with fuel and, optionally, oxidizer, as discussed below, and is combusted. Hot gases of combustion flow from each combustor 16 to a turbine section 18 to drive the system 10 and generate power.

Each combustor 16 in the gas turbine 10 may include a variety of components for mixing and combusting the working fluid, fuel and, if required, oxidizer. For example, the combustor 16 may include a casing 20. A variety of sleeves, which may be generally annular sleeves, may be at least partially disposed in the casing 20. For example, a combustor liner 22 may generally define a combustion zone 24 therein. Combustion of the working fluid, fuel, and optional oxidizer may generally occur in the combustion zone 24. The resulting hot gases of combustion may flow downstream through the combustion liner 22 into a transition piece 26. A flow sleeve 30 may generally surround at least a portion of the combustor liner 22 and define a flow path 32 therebetween. An impingement sleeve 34 may generally surround at least a portion of the transition piece 26 and define a flow path 36 therebetween. Working fluid entering the combustor section 14 may flow upstream in the casing 20, and at least a portion of the working fluid may enter the flow paths 32 and 36 through holes (not shown) defined in the flow sleeve and 30 and impingement sleeve 34. As discussed below, the working fluid may then enter the combustion zone 24 for combustion.

The combustor 16 may further include a fuel nozzle 40 or a plurality of fuel nozzles 40. Fuel and, optionally, oxidizer may be supplied to the fuel nozzles 40 by one or more manifolds (not shown). Additionally, working fluid may be supplied to the fuel nozzles 40, if desired. As discussed below, the fuel nozzle 40 or fuel nozzles 40 may supply the fuel, oxidizer, and/or working fluid to the combustion zone 24 for combustion.

It should be readily appreciated that a combustor 16 need not be configured as described above and illustrated herein and may generally have any configuration that permits working fluid to be mixed with fuel, combusted and transferred to a turbine section 18 of the system 10. For example, the present disclosure encompasses annular combustors and silo-type combustors as well as any other suitable combustors.

In many cases, it may be desirable to mix the fuel, oxidizer, and/or working fluid quickly and thoroughly before combustion occurs. For example, quick and thorough mixing may promote high flame temperatures, which in turn may promote high efficiency combustion and flame stability.

Figure 2:
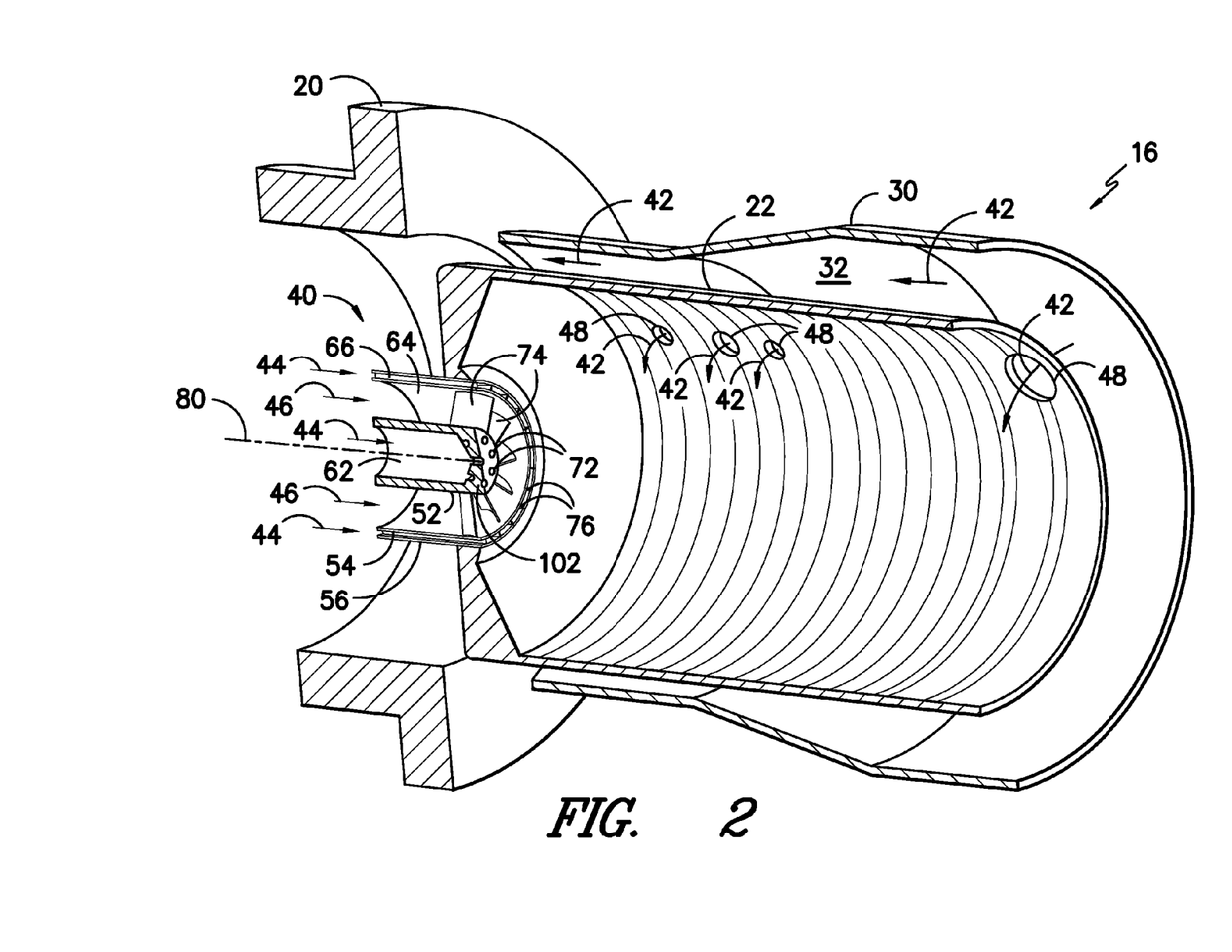
FIG. 2 is a perspective view of a portion of a combustor and a fuel nozzle according to one embodiment of the present disclosure.

Thus, the present disclosure is directed to an improved fuel nozzle 40, and to a combustor 16 containing fuel nozzle 40. In some embodiments, such as the embodiment as shown in FIG. 2, the combustor 16 may be a low-oxygen combustor 16. In particular, in some embodiments the low-oxygen combustor 16 may be part of a generally closed system 10 that utilizes recirculated emissions as a working fluid. In these embodiments, working fluid 42 may be a low-oxygen working fluid 42. Fuel 44 and oxidizer 46 may be flowed through the fuel nozzle 40 to low-oxygen combustion zone 24 for combustion. Low-oxygen working fluid 42 may be flowed into the combustion zone 24 through apertures 48 defined in the combustor liner 22, or through any other suitable locations, thus creating a low-oxygen environment in the combustion zone 24.

It should be understood, however, that the present disclosure is not limited to low-oxygen combustors 16 having the above disclosed design. Rather, any suitable low-oxygen combustor 16 or combustor 16 in general is within the scope and spirit of the present disclosure.

Fuel 44, according to the present disclosure, may be any suitable fluid, such as any suitable gas. In exemplary embodiments, fuel 44 may be natural gas. Oxidizer 46 may be any suitable oxidizer. In exemplary embodiments, oxidizer 46 may be air or pure oxygen. Further, it should be understood that, in some embodiments, oxidizer 46 may simply be a portion of the working fluid 42. For example, in low-oxygen combustors 16, oxidizer 46 may generally be a separate fluid from working fluid 42, and may provide additional oxygen to the combustion zone 24 to aid combustion. In combustors 16 that are not low-oxygen, however, the working fluid 42 may contain sufficient oxygen for combustion, and the oxidizer 46 may simply be a portion of the working fluid 42 or may be a separate fluid that may provide additional oxygen.

As discussed above, fuel 44 and/or oxidizer 46 may be flowed through a fuel nozzle 40 to the combustion zone 24. Further, the fuel nozzle 40 design may facilitate quick and thorough mixing of the fuel 44 and/or oxidizer 46 in the combustion zone 24, such that relatively high efficiency combustion occurs.

Thus, as shown in FIGS. 2 through 5, a fuel nozzle 40 according to the present disclosure may include an inner tube 52, and intermediate tube 54 at least partially surrounding the inner tube 52, and an outer tube 56 at least partially surrounding the intermediate tube 54. In exemplary embodiments, the various tubes may have generally cylindrical shapes, although it should be understood that each tube may have any suitable shape and size. The inner tube 52 may define a first flow passage 62 therethrough. The intermediate tube 54 may define a second flow passage 64 therethrough, such as between the intermediate tube 54 and the inner tube 52. The outer tube 56 may define a third flow passage 66 therethrough, such as between the outer tube 56 and the intermediate tube 54. The flow passages 62, 64, 66 may each flow fuel 44 and/or oxidizer 46 therethrough, and may further provide this fuel 44 and/or oxidizer 46 to the combustion zone 24 for mixing and combustion. For example, in exemplary embodiments, the first flow passage 62 and the third flow passage 66 may flow fuel 44 therethrough, while the second flow passage 64 may flow oxidizer 46 therethrough. It should be understood, however, that any of the flow passages 62, 64, 66 may flow fuel 44 and/or oxidizer therethrough in any configuration, as desired or required.

As shown, each of the tubes 52, 54, 56 may comprise a swirler device or a plurality of swirler devices. For example, inner tube 52 may comprise a first swirler device 72, intermediate tube 54 may comprise a second swirler device 74, and outer tube 56 may comprise a third swirler device 76. Each of the swirler devices 72, 74, 76 may be configured to impart a swirl on the fuel 44 and/or oxidizer flowing through the respective flow passage 62, 64, 66. A swirl, as used herein, means a rotation with respect to a generally axial flow axis 80 extending through the flow nozzle 40. Fuel 44 and/or oxidizer 46 flowing through the various passages 62, 64, 66 may flow generally along the axial flow axis 80. After a swirl is imparted to the flow, the fuel 44 and/or oxidizer 46 may flow with a rotational component as flow continues generally along the axial flow axis 80.

Imparting of a swirl on each of the flows of fuel 44 and/or oxidizer 46 may cause the individual flows to, upon being exhausted from the fuel nozzle 40 into the combustion zone 24, quickly and efficiently mix. This mixing may encourage more efficient combustion, as discussed above.

In some embodiments, to further promote mixing of the various flows, various of the swirler devices may be configured to impart a swirl that is generally opposite to the swirl imparted by other of the swirler devices. For example, in one exemplary embodiment, the second swirler device 74 may be configured to impart a swirl on the fuel 44 and/or oxidizer 46 flowing through the second flow passage 64 that is generally opposite to the swirl imparted by the first swirler device 72 and the third swirler device 76. Alternatively, any of the swirler devices may impart a swirl that is generally opposite of any other swirler devices.

Figure 5:
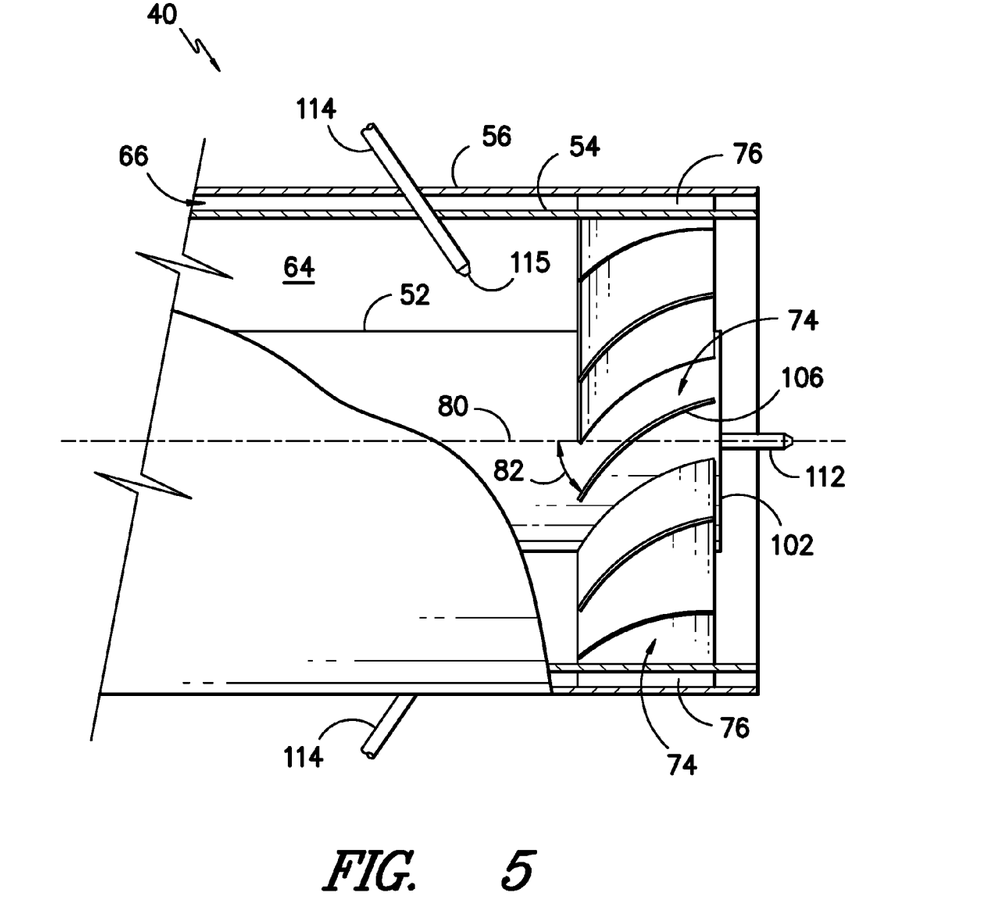
FIG. 5 is a side view of a fuel nozzle with various cutaway portions according to one embodiment of the present disclosure.

In order to impart a swirl on the fuel 44 and/or oxidizer 46 flowing through the various fuel passages 62, 64, 66, the swirler devices may generally be positioned at an angle 82 to the axial flow axis 80, as shown in FIG. 5. Being positioned at an angle to the axial flow axis 80 means that fuel 44 and/or oxidizer 46 flowing through or past the swirler devices has a flow component at an angle to the axial flow axis 80 upon exiting the swirler device. In some embodiments, the angle 82 of at least a portion of one or more of the swirler devices, such as of the passages or vanes as discussed below, may be in the range between 40° and 60°. It should be understood, however, that the present disclosure is not limited to the above disclosed range of angles, and rather that any suitable angle or range of angles is within the scope and spirit of the present disclosure.

Figure 3:
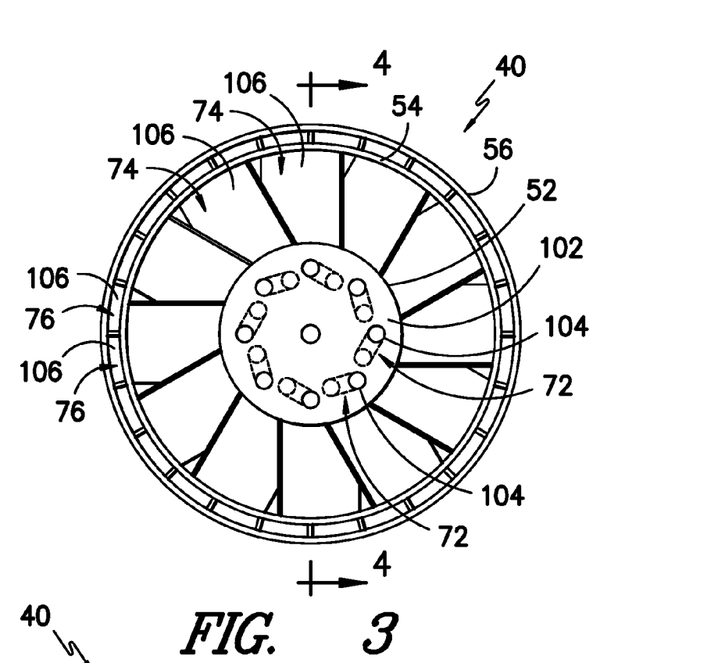
FIG. 3 is a front view of a fuel nozzle according to one embodiment of the present disclosure.
Figure 4:
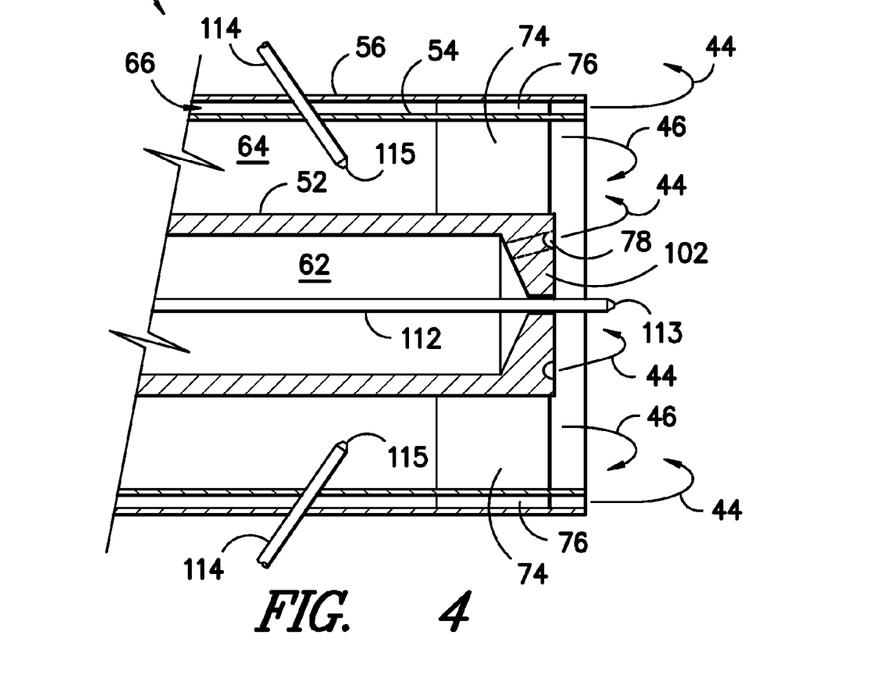
FIG. 4 is a cross-sectional side view of a fuel nozzle, along the lines 4-4 of FIG. 4, according to one embodiment of the present disclosure.

In some embodiments, a swirler device may comprise a passage or a plurality of passages. For example, as shown in FIGS. 2 through 4, in some embodiments, one or more of the tubes, such as the inner tube 52, may comprise a tip 102. The tip 102 may generally be a solid portion of the tube which may generally block the flow of fuel 44 and/or oxidizer 46 through the associated flow passage, such as the first flow passage 62. In exemplary embodiments, as shown in FIGS. 2 through 4, the tip 102 may be disposed at an end of the tube, such as at the downstream end adjacent the combustion zone 24. A swirler device in these embodiments may comprise a passage 104 or a plurality of passages 104 defined in the tip 102 and extending therethrough. At least a portion of the passages 104 may be configured to impart a swirl on the fuel 44 and/or oxidizer 46 flowing therethrough. For example, the passages 104 may extend through the tip 102 at an angle to the axial flow axis 82, as discussed above, such that upon being exhausted from the passages 104, the flow of fuel 44 and/or oxidizer 46 has an angled flow component with respect to the axial flow axis 82. The passages 104 may be generally straight, curved, or have any other suitable configuration to provide this angled flow component. It should be understood that any of the first swirler device 72, second swirler device 74, and/or third swirler device 76 may include a passage 104 or plurality of passages 104, as desired or required.

In other embodiments, a swirler device may comprise a vane 106 or a plurality of vanes 106. For example, as shown in FIGS. 2 through 5, in some embodiments, one or more of the tubes, such as the intermediate tube 54 and the outer tube 56, may include a plurality of vanes 106. The vanes 106 may be disposed in a generally annular array in a flow passage, such as in the second flow passage 64 and the third flow passage 66. At least a portion of the vanes 106 may be configured to impart a swirl on the fuel 44 and/or oxidizer 46 flowing past in the flow passage. For example, the vanes 106 may be positioned at an angle to the axial flow axis 82, as discussed above, such that upon passing the vanes 106, the flow of fuel 44 and/or oxidizer 46 has an angled flow component with respect to the axial flow axis 82. The vanes 106 may be generally straight, curved, or have any other suitable configuration to provide this angled flow component. It should be understood that any of the first swirler device 72, second swirler device 74, and/or third swirler device 76 may include a vane 106 or plurality of vanes 106, as desired or required.

In some embodiments, the fuel nozzle 40 may further comprise an igniter device or a plurality of igniter devices extending through at least a portion of a flow passage or a plurality of flow passages. The igniter devices may be provided to ignite the fuel, oxidizer, and/or working fluid, either alone or when mixed together, to cause combustion. For example, as shown in FIG. 4, an igniter device 112 or a plurality of igniter devices 112 may extend through at least a portion of the first flow passage 62. If required, in some embodiments, the igniter device 114 or igniter devices 114 may additionally extend through the second flow passage 64 and/or the third flow passage 66 to access the first flow passage 62. In some embodiments, igniter device 112 may extend past the first flow passage 62 such that end 113 of the igniter device 112 is disposed in the combustion zone 24. In other embodiments, end 113 may be disposed in the first flow passage 62. A swirler device disposed in first flow passage 62, such as first swirler device 72, may be upstream or downstream of the end 113 of the igniter device 112, as desired or required.

Additionally or alternatively, as shown in FIG. 4, an igniter device 114 or a plurality of igniter devices 114 may extend through at least a portion of the second flow passage 64. As shown, in some embodiments, the igniter device 114 or igniter devices 114 may additionally extend through the third flow passage 66 to access the second flow passage 64. In some embodiments, igniter device 114 may extend past the second flow passage 64 such that end 115 of the igniter device 114 is disposed in the combustion zone 24. In other embodiments, end 115 may be disposed in the second flow passage 64. A swirler device disposed in second flow passage 64, such as second swirler device 74, may be upstream or downstream of the end 115 of the igniter device 114, as desired or required.

Additionally or alternatively, an igniter device (not shown) or a plurality of igniter devices may extend through at least a portion of the third flow passage 66. In some embodiments, the igniter device may extend past the third flow passage 66 such that an end of the igniter device is disposed in the combustion zone 24. In other embodiments, the end may be disposed in the third flow passage 66. A swirler device disposed in third flow passage 66, such as third swirler device 76, may be upstream or downstream of the end of the igniter device, as desired or required.

An igniter device 112 or 114 may be any device suitable to ignite the working fluid 42, fuel 44, or oxidizer 46. For example, an igniter device 112 or 114 may be a torch that produces a flame, or may be a device that produces a spark, laser, or any other suitable ignition source.

The present disclosure is further directed to a method for operation of a combustor 14. The method may include, for example, flowing a fuel 44 and an oxidizer 46 through a fuel nozzle 40. The fuel nozzle 40 may comprise an inner tube 52, an intermediate tube 54, and an outer tube 56 each configured for flowing one of the fuel 44 or the oxidizer 46 therethrough, as discussed above.

The method may further include imparting a swirl to the fuel 44 and the oxidizer 46 in the fuel nozzle 40, as discussed above. The method may further include exhausting the fuel 44 and the oxidizer 46 from the fuel nozzle 40 into a combustion zone 24, as discussed above. Further, in some embodiment, the present method may include combusting the fuel 44 and the oxidizer 46 in the combustion zone 24, as discussed above.

The fuel nozzle and method of the present disclosure may provide relatively better mixing of fuel 44 and oxidizer 46, promoting relatively faster combustion, shorter residence times, larger flame zones, and near-stochiometric conditions. For example, the rapid combustion of the fuel 44 and oxidizer 46 may minimize the exposure time of the fuel 44 and oxidizer 46 to the working fluid 42. Further, the rapid combustion may result in higher flame temperatures, which may in turn promote higher efficiency combustion and better flame stability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel nozzle for a combustor, the fuel nozzle comprising:
    an inner tube defining a first flow passage for flowing one of a fuel or an oxidizer therethrough, the inner tube comprising a first swirler device configured to impart a swirl on the one of the fuel or the oxidizer;
    an intermediate tube at least partially surrounding the inner tube and defining a second flow passage for flowing one of a fuel or an oxidizer therethrough, the intermediate tube comprising a second swirler device configured to impart a swirl on the one of the fuel or the oxidizer;
    an outer tube at least partially surrounding the intermediate tube and defining a third flow passage for flowing one of a fuel or an oxidizer therethrough, the outer tube comprising a third swirler device configured to impart a swirl on the one of the fuel or the oxidizer; and
    a plurality of igniter devices, wherein different ones of the plurality of igniter devices extend through a different one of the first flow passage, the second flow passage, or the third flow passage;
    wherein the inner tube includes a tip extending across the first flow passage, and
    wherein the first swirler device comprises a passage defined through the tip configured to impart a swirl on fuel flowing through the passage defined through the tip,
    wherein at least one of the first swirler device, the second swirler device, or the third swirler device comprises a plurality of swirler vanes, at least a portion of the swirler vanes configured to impart a swirl on the one of the fuel or the oxidizer, and
    wherein one of the first flow passage, the second flow passage or the third flow passage flows fuel therethrough, another of the first flow passage, the second flow passage or the third flow passage flows fuel therethrough, and a third of the first flow passage, the second flow passage or the third flow passage flows oxidizer therethrough, and wherein no fuel is flowed through the third of the first flow passage, the second flow passage or the third flow passage.

2. The fuel nozzle of claim 1, wherein the first flow passage flows fuel therethrough, the second flow passage flows oxidizer therethrough, and the third flow passage flows fuel therethrough.

3. The fuel nozzle of claim 1, wherein the fuel is natural gas.

4. The fuel nozzle of claim 1, wherein the oxidizer is oxygen.

5. The fuel nozzle of claim 1, wherein the second swirler device is configured to impart a swirl generally opposite to the swirl of the first swirler device and the third swirler device.

6. The fuel nozzle of claim 1, wherein each of the first flow passage, the second flow passage, and the third flow passage defines a generally axial axis, and wherein each of the first swirler device, the second swirler device, and the third swirler device is positioned at an angle with respect to the axial axis in the range between approximately 40° and approximately 60°.

7. The fuel nozzle of claim 1, wherein the second swirler device and the third swirler device each comprise a plurality of swirler vanes, at least a portion of the swirler vanes configured to impart a swirl on the one of the fuel or the oxidizer.

8. A combustor comprising:
    a combustor liner, the combustor liner defining a combustion zone therein; and
    a fuel nozzle in fluid communication with the combustor liner, the fuel nozzle comprising:
        an inner tube defining a first flow passage for flowing one of a fuel or an oxidizer therethrough, the inner tube comprising a first swirler device configured to impart a swirl on the one of the fuel or the oxidizer;
        an intermediate tube at least partially surrounding the inner tube and defining a second flow passage for flowing one of a fuel or an oxidizer therethrough, the intermediate tube comprising a second swirler device configured to impart a swirl on the one of the fuel or the oxidizer;
        an outer tube at least partially surrounding the intermediate tube and defining a third flow passage for flowing one of a fuel or an oxidizer therethrough, the outer tube comprising a third swirler device configured to impart a swirl on the one of the fuel or the oxidizer; and
        a plurality of igniter devices, wherein different ones of the plurality of igniter devices extend through a different one of the first flow passage, the second flow passage, or the third flow passage;
        wherein the inner tube includes a tip extending across the first flow passage, and
        wherein the first swirler device comprises a passage defined through the tip configured to impart a swirl on fuel flowing through the passage defined through the tip,
        wherein at least one of the first swirler device, the second swirler device, or the third swirler device comprises a plurality of swirler vanes, at least a portion of the swirler vanes configured to impart a swirl on the one of the fuel or the oxidizer, and
        wherein one of the first flow passage, the second flow passage or the third flow passage flows fuel therethrough, another of the first flow passage, the second flow passage or the third flow passage flows fuel therethrough, and a third of the first flow passage, the second flow passage or the third flow passage flows oxidizer therethrough, and wherein no fuel is flowed through the third of the first flow passage, the second flow passage or the third flow passage.

9. The combustor of claim 8, wherein the combustion zone is a low-oxygen combustion zone.

10. The combustor of claim 8, wherein the first flow passage flows fuel therethrough, the second flow passage flows oxidizer therethrough, and the third flow passage flows fuel therethrough.

11. The combustor of claim 8, wherein the second swirler device is configured to impart a swirl generally opposite to the swirl of the first swirler device and the third swirler device.

12. The combustor of claim 8, wherein each of the first flow passage, the second flow passage, and the third flow passage defines a generally axial axis, and wherein each of the first swirler device, the second swirler device, and the third swirler device is positioned at an angle with respect to the axial axis in the range between approximately 40° and approximately 60°.

13. The combustor of claim 8, wherein the second swirler device and the third swirler device each comprise a plurality of swirler vanes, at least a portion of the swirler vanes configured to impart a swirl on the one of the fuel or the oxidizer.

14. The combustor of claim 8, wherein one igniter device of the plurality of igniter devices extends through at least a portion of the first flow passage and into the combustion zone.

15. A method for operating a combustor, the method comprising:
flowing a fuel and an oxidizer through a fuel nozzle, the fuel nozzle comprising an inner tube, an intermediate tube, and an outer tube each configured for flowing one of the fuel or the oxidizer therethrough, wherein at least one of the inner tube, the intermediate tube, or the outer tube comprises a plurality of swirler vanes, wherein one of a first flow passage defined by the inner tube, a second flow passage defined by the intermediate tube or a third flow passage defined by the outer tube flows fuel therethrough, another of the first flow passage, the second flow passage or the third flow passage flows fuel therethrough, and a third of the first flow passage, the second flow passage or the third flow passage flows oxidizer therethrough, and wherein no fuel is flowed through the third of the first flow passage, the second flow passage or the third flow passage, wherein the first swirler device comprises a passage defined through the tip configured to impart a swirl on fuel flowing through the passage defined through the tip, and wherein a plurality of igniter devices are disposed within the fuel nozzle, wherein different ones of the plurality of igniter devices extend through a different one of the first flow passage, the second flow passage, or the third flow passage;
imparting a swirl to the fuel and the oxidizer in the fuel nozzle; and
exhausting the fuel and the oxidizer from the fuel nozzle into a combustion zone.

16. The method of claim 15, further comprising combusting the fuel and the oxidizer in the combustion zone.

17. The fuel nozzle of claim 1, wherein at least one igniter device of the plurality of igniter devices extends through one of the second flow passage or the third flow passage.

18. The fuel nozzle of claim 17, wherein another igniter device of the plurality of igniter devices extends through at least a portion of the first flow passage and into the combustion zone.

19. The fuel nozzle of claim 17, wherein the at least one igniter of the plurality of igniter devices extends through the third flow passage, and wherein the at least one igniter includes an end disposed within the second flow passage.

20. The combustor of claim 14, wherein another igniter device of the plurality of igniter devices extends through one of the second flow passage or the third flow passage.

* * * * *

UNITED STATES PATENT AND TRADEMARK OFFICE
CERTIFICATE OF CORRECTION

PATENT NO. : 9,500,369 B2
APPLICATION NO. : 13/449695
DATED : November 22, 2016
INVENTOR(S) : Popovic et al.

It is certified that error appears in the above-identified patent and that said Letters Patent is hereby corrected as shown below:

On the Title Page

In item (75), under "Inventors", in Column 1, Line 4, delete "Belvaev," and insert -- Belyaev, --, therefor.

In item (74), under "Attorney, Agent, or Firm", in Column 2, Line 2, delete "Operations" and insert -- Operation --, therefor.

In the Claims

In Column 8, Line 54, in Claim 8, delete "passage;" and insert -- passage, --, therefor.

In Column 10, Line 11, in Claim 15, delete "wherein the first" and insert -- wherein the inner tube includes a tip extending across the first flow passage, and wherein the first --, therefor.

Signed and Sealed this
Twenty-fifth Day of July, 2017

Joseph Matal
*Performing the Functions and Duties of the
Under Secretary of Commerce for Intellectual Property and
Director of the United States Patent and Trademark Office*